(12) United States Patent
Zhu et al.

(10) Patent No.: US 6,989,671 B2
(45) Date of Patent: Jan. 24, 2006

(54) DETECTION OF SLIDER-DISK INTERFERENCE USING A DYNAMIC PARAMETRIC TEST

(75) Inventors: Li-Yan Zhu, San Jose, CA (US); Xiaofeng Zhang, Fremont, CA (US); Yen Fu, San Jose, CA (US); Ellis T. Cha, San Jose, CA (US)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 10/342,780

(22) Filed: Jan. 14, 2003

(65) Prior Publication Data

US 2004/0135575 A1 Jul. 15, 2004

(51) Int. Cl.
*G01R 33/12* (2006.01)

(52) U.S. Cl. ............... 324/212; 360/77.08; 324/210
(58) Field of Classification Search ............. 324/210, 324/212; 360/77.02, 77.04, 77.08, 903, 97.01, 360/97.02, 98.08, 99.12
See application file for complete search history.

(56) References Cited

U.S. PATENT DOCUMENTS

| | | | |
|---|---|---|---|
| 4,777,544 A | | 10/1988 | Brown et al. |
| 4,881,136 A | * | 11/1989 | Shiraishi et al. ............ 360/25 |
| 5,130,868 A | | 7/1992 | Ida |
| 5,256,965 A | * | 10/1993 | Nomura ................. 324/212 |
| 5,594,595 A | | 1/1997 | Zhu |
| 6,229,303 B1 | * | 5/2001 | Guzik .................. 324/212 |
| 6,570,378 B2 | * | 5/2003 | Goh et al. ............... 324/212 |

OTHER PUBLICATIONS

"Sensitive Magnetic Head–Disk Spacing Measurements in Recording Drives," Novotny et al. IEEE Tran. Magn. vol. 34, No., 4 Jul. 1998 pp. 1762–1764.

"Flying Height Measurement while Seeking in Hard Disk Drives,"Schardt et al., IEEE Tran. Magn. vol. 34, No. 4, Jul. 1998, pp. 1765–1767.

* cited by examiner

*Primary Examiner*—Bot Ledynh
*Assistant Examiner*—Reena Aurora
(74) *Attorney, Agent, or Firm*—Kenyon & Kenyon

(57) ABSTRACT

A method is described for calculating head disk interference (HDI) using a dynamic parametric test. In one embodiment, HDI is calculated based on an actual and ideal sensitivity profile based on a read-back signal track profile for the slider/head.

19 Claims, 7 Drawing Sheets

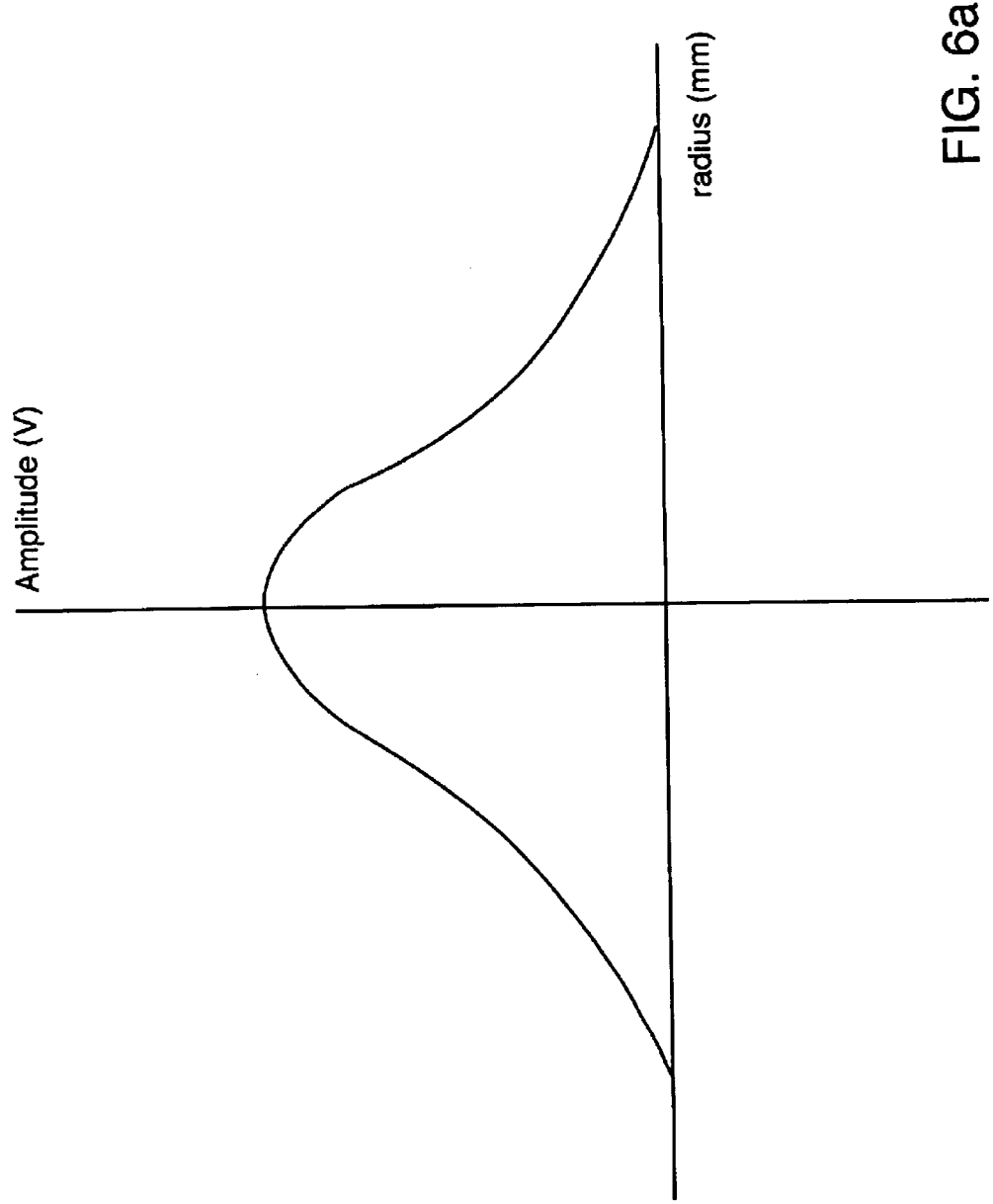

DETECTION OF SLIDER-DISK INTERFERENCE USING A DYNAMIC PARAMETRIC TEST

FIELD OF THE INVENTION

The present invention pertains to testing of components in hard disk drives and the like. More particularly, the present invention pertains to the detection of slider-disk interference during component-level magnetic tests.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 75.

As the flying height of the slider decreases, interference between the slider ABS and the disk surface increases in frequency. This interference is often called "head-disk interference" (HDI). It includes both direct contact between the slider and the disk, and indirect contact through debris, lubricant, etc. on the disk surface. The greater the HDI, the more wear and tear on the slider and its ABS. HDI can damage the read-write head directly, or cause catastrophic failure by disabling the air bearing.

To combat the problems associated with HDI, a tolerance is set for the flying height of the slider. Thus, it is assumed that if the measured flying height of the slider is too low, then there will be too much HDI, adversely affecting the operation of the hard-disk drive. As stated above, however, the lower the flying height of the slider, the greater the data capacity for the drive.

One problem seen with using a flying height tolerance to control HDI is that as the flying height of conventional sliders is reduced, the tolerances become tighter. A typical flying height for a slider is a few nanometers. Variations in surface topography for the disk and slider, vibration in both surfaces, and debris/lubricant accumulating, migrating, and dropping off both surfaces add complexity to the measurement of flying height at any particular time.

As sliders have become smaller and smaller, it becomes more difficult to include traditional spacing transducers such as capacitance probes, photonic probes, etc. Furthermore, testing the flying height of a slider over a transparent disk as is known in the art causes additional problems. Since the transparent disk and the magnetic disk used in the drive differ in mounting conditions, disk roughness, and electrostatic attraction caused by "tribo-charging," the measure of flying height over the transparent disk may not correlate to the flying height over the magnetic disk. Also, the measurement resolution of the flying height at such a low flying height can be very poor, and measurement of flying height over the transparent disk can cause contamination of the slider or electrostatic discharge (ESD) damage.

Since flying height varies over particular areas of the slider, it has been suggested to measure flying height over a very small region of the air bearing surface. For example, "magnetic spacing" would be the space directly under the read-write head and may be measured by analyzing the read-back signal from the read-write head. During measurement of the magnetic spacing, the disk speed, air pressure, gas composition in the slider-disk interface is controlled to reduce the flying height of the slider. Flying height may also be reduced by applying a DC voltage across the slider-disk interface. The change in magnetic spacing can be calculated e.g., using the Wallace equation. Thus, a slider that can have its magnetic spacing reduced by a significant amount is presumed to have an adequate flying-height margin. To implement this method of measuring magnetic spacing requires relatively expensive equipment and does not guarantee that other parts of the slider have impacted the disk.

Rather than inferring the flying height of the slider, some methods known in the art attempt to detect the HDI directly. For example, friction between the slider and disk can be measured by either a strain-gauge or by motor power consumption. Slider-disk impact can be measured from the acoustic emission of the slider or by a piezo-electric sensor. Perturbation of the slider position relative to the disk can be detected through amplitude, frequency, or phase modulation in the read-back signal. The equipment needed to measure these parameters can be expensive and may not be able to detect mild head-disk interference. One other method for HDI detection is to detect temperature changes in the read-write head. As with the magnetic spacing measurements described above, the only area being monitored is the read-write head, and other areas on the slider may impact the disk.

In view of the above, there is a need to measure HDI directly while avoiding the cost and measurement problems seen in the art.

SUMMARY OF THE INVENTION

According to an embodiment of the present invention, HDI is measured inferentially during a dynamic parametric test. The slider and read/write head is displaced a number of steps across a fully written track on the disk. The amplitude measurements during the dynamic parametric test can be processed in such a manner to provide a track misregistration measurement that, in this example, would be indicative of HDI. Preferably, the measurement should be conducted without additional equipment and handling.

In the current manufacturing process, a head gimbal assembly (HGA) 40 is routinely flown over a spinning disk, to test its magnetic performance. This procedure is known as either MAG test, or more precisely a dynamic parametric (DP) test. A DP test further includes a subroutine known as "track-profile test." In a track-profile test, an isolated track is written on the disk. Then a read-head is displaced across the written track in a large number (in the order of 100) of steps. Clearly, the amplitude of read-back signal is maximized when the read-head is perfectly aligned with the written track. By analyzing the rise and fall of the read-back amplitude, the widths of the read transducer and the write transducer can be both obtained.

Currently, the track-profile test is performed solely for magnetic purposes. However, according to an embodiment of the present invention, the track-profile also exhibits signs of HDI. By properly analyzing the track-profile, the severity of HDI can be determined.

BRIEF DESCRIPTION OF THE DRAWINGS

FIGS. 6a–b are graphs showing measurements of amplitude during the dynamic parametric test

DETAILED DESCRIPTION

Figure 1:
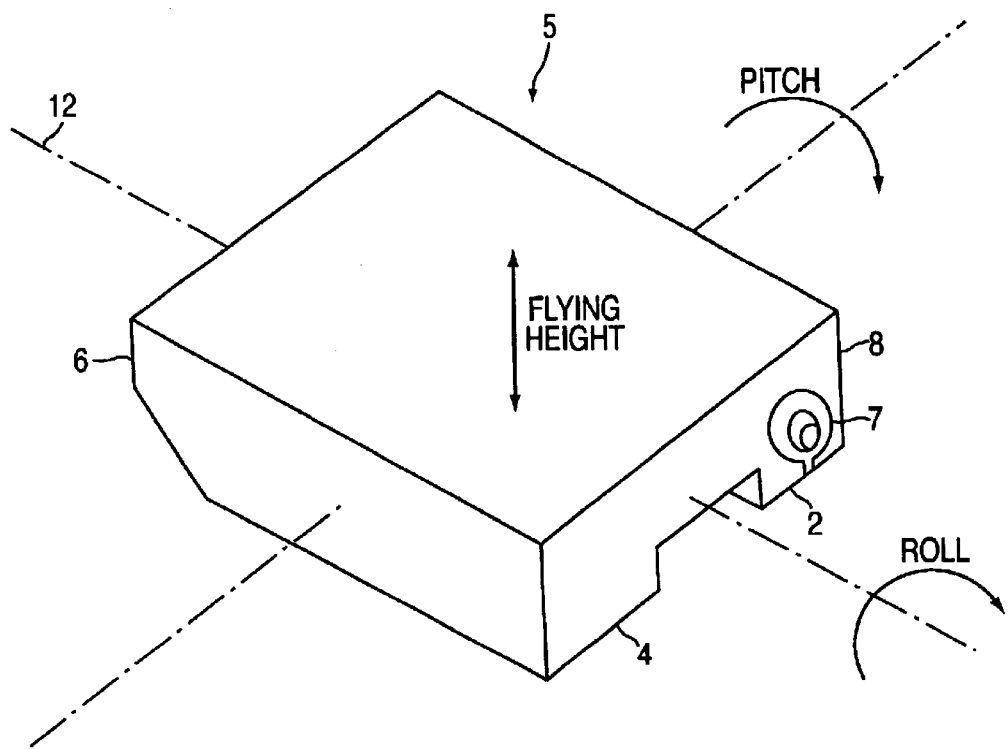
FIG. 1 is a perspective view of a slider device with a read/write head that is known in the art.
Figure 2:
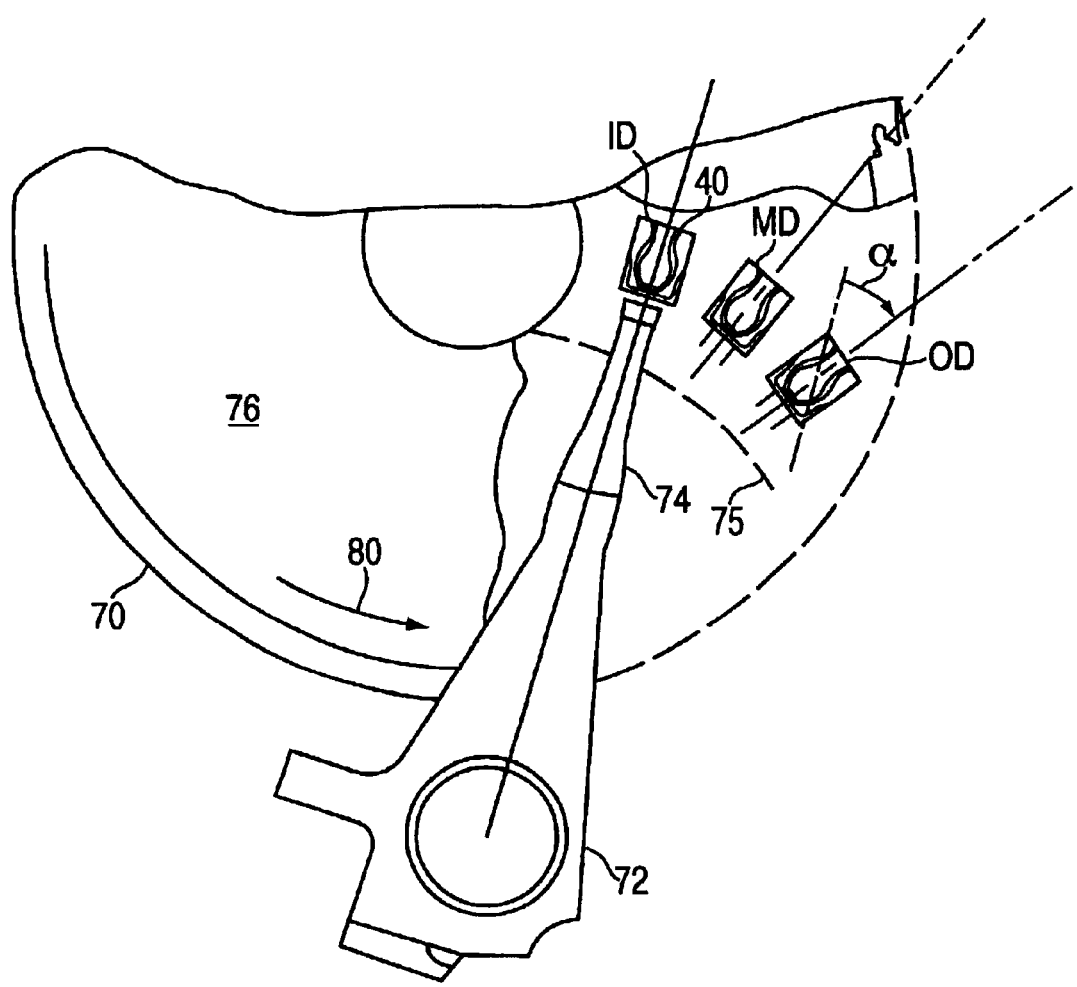
FIG. 2 is a perspective view of a disk drive device that is known in the art.
Figure 3:
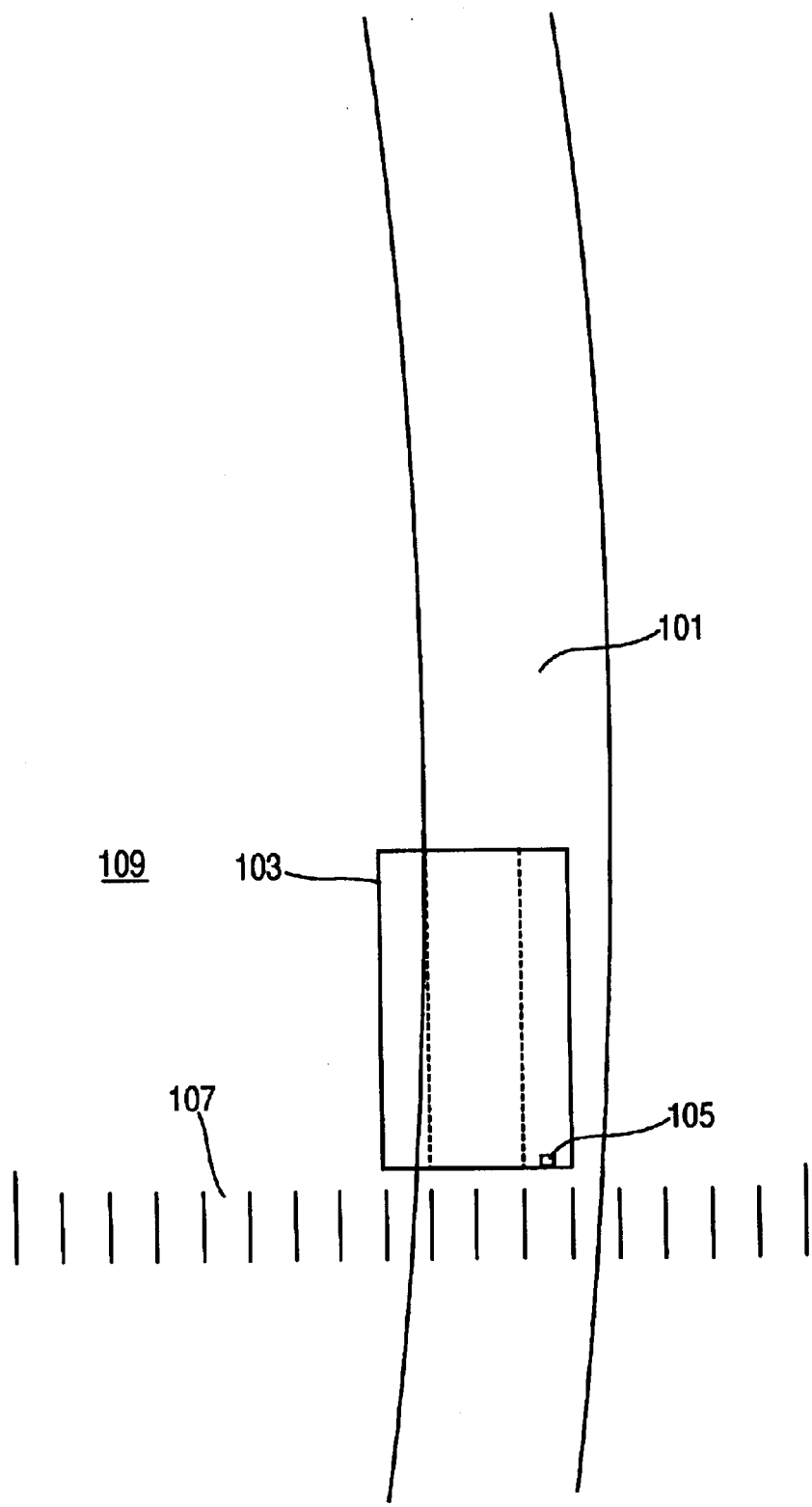
FIG. 3 is a plan view of a slider relative to a track in a hard disk drive positioned according to an embodiment of the present invention.

Referring to FIG. 3, a view of a slider 103 over a moving disk is shown. In this embodiment, the slider 103 is a simple catamaran slider with a read-write head 105, but the present invention is not limited to such a slider. Slider 103 is coupled to a suspension and drive (e.g., a lead scres and a piezoelectric actuator) so that it can be positioned at a specified location over the moving disk 109. For the sake of clarity, the suspension and drive motor are not shown explicitly in FIG. 3. According to an embodiment of the present invention, the slider 103 (in particular read-write head 105) is moved a variety of steps (107) over the moving disk 109 relative to a single recording track 101. In this embodiment, the slider is moved in increments of length S (e.g., S=5 nanometers) and the track 101 is fully and uniformly recorded.

Figure 4:
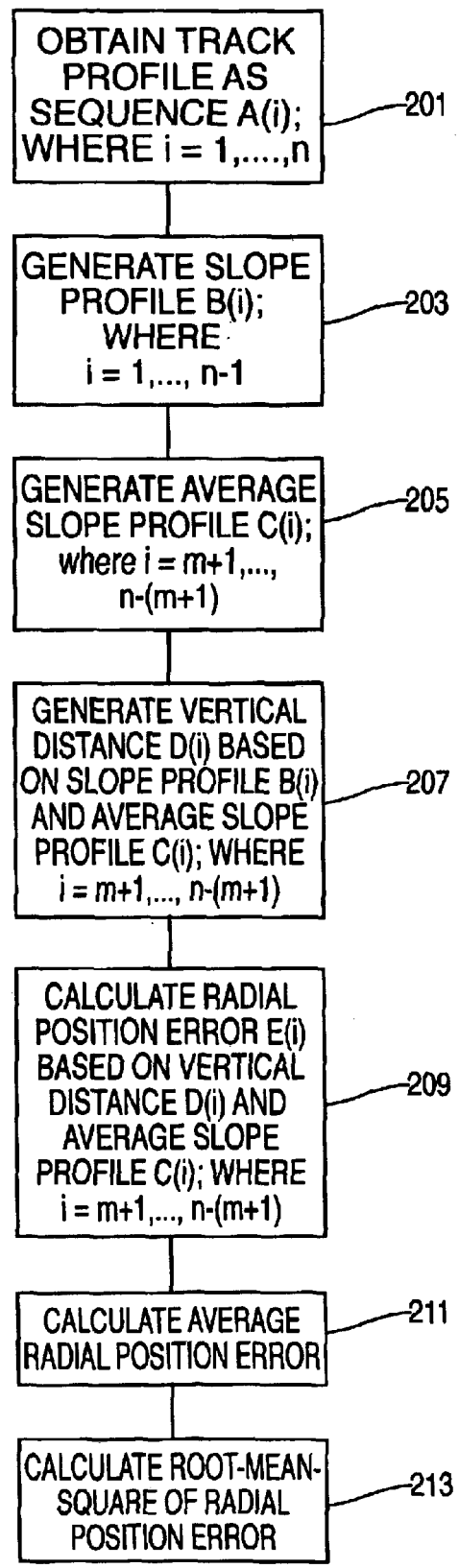
FIG. 4 is flow diagram of a method according to an embodiment of the present invention.

Referring to FIG. 4, a flow diagram of a method for measuring HDI for the slider 103 is shown according to an embodiment of the present invention. In block 201, a dynamic parametric (DP) test is performed where the amplitude A is obtained. In this embodiment, the amplitude A is obtained at a plurality of index points (e.g., element 107 in FIG. 3). Thus the amplitude A is obtained as a series A(i) where i is an index and i=1, 2, 3, . . . , n. Each increment in the index i represents a step forward in the read-head movement. In this embodiment, it is intended that the read-write head pass between points that are outside of the track profile 101.

In block 203, a slope or sensitivity profile B(i) is generated based on the amplitude A, such that $$B(i)=A(i+1)-A(i) \quad \text{Eq. 1}$$

Given B(i), a smoothed-sloped profile, C(i) can be generated (block 205), where i=m+1, m+2, . . . , n−(m+1) and where j=i−m, i−m+1, . . . , i, i+1, . . . i+m−1, i+m.

$$C(i) = \frac{1}{2m+1} \cdot \sum_{j=i-m}^{j=i+m} B(j) \quad \text{Eq. 2}$$

C(i) can be thought of as a moving average for B(i) as it takes in, at times, a subset of the values for B(i). For a moving average, an odd number of data points are chosen in this embodiment for symmetry purposes (i.e., 2m+1 data points centered around the point m+1). In this embodiment, the range for the moving average, namely 2m+1 is selected between one-eighth and one-quarter of the track-width. Also in this example, a uniform weight of 1/(2m+1) is chosen, though a non-uniform weight may be used as well.

A vertical distance between the original slope profile, B(i), and the smoothed slope-profile C(i) may be designated as D(i) (block 207) where $$D(i)=|C(i)-B(i)| \quad \text{Eq. 3}$$

where i=m+1, m+2, . . . , n−(m+1).

Since differentiation in Eq. 1 above is respect to index i, D(i) and A(i) are measured in the same units—voltage of the readback signal. The corresponding radial position error E(i), which is commonly referred to as track mis-registration (TMR) is given by $$E(i) = S \times D(i)/|C(i)| \qquad \text{Eq. 4}$$

where $i = m+1, m+2, \ldots, n-(m+1)$ and S is the uniform increment described above with respect to A(i) (block 209).

E(i) is a vector comprising various components or cells. As seen from the above equations, E(i) is based on the variables A(i) and C(i). Due to the fluctuation in read-head gain, and a variety of mechanical vibration, there is random noise affecting the values in A(i), and thus, E(i). Also, there is a systematic error in C(i) associated with the numerical smoothing scheme described above, which affects E(i) as well. For statistical purposes in this embodiment of the present invention, a weighted average is applied to E(i). The optimal weight is inversely proportional to the variance of the noise content in E(i). Since the noise is inversely proportional to the slope C(i), the optimal weight is directly proportional to the square of C(i). Thus, the weighted average, e, of E(i) is given by $$e \equiv \frac{\sum [C(i) \cdot C(i) \cdot E(i)]}{\sum [C(i) \cdot C(i)]} = S \cdot \frac{\sum [|C(i) \cdot D(i)|]}{\sum [C(i) \cdot C(i)]} \qquad \text{Eq. 5}$$

where the limits of summation are from $m+1$ to $n-(m+1)$ (block 209). Thus, Eq. 5 gives a weighted average track mis-registration, e, measured as a unit of length per step (i.e., each step taken in measuring A(i)). A weighted root-mean-square, E of track mis-registration can be obtained from the following:

$$\varepsilon = S \cdot \sqrt{\frac{\sum [C^2(i) \cdot D^2(i)]}{\sum C^4(i)}} \qquad \text{Eq. 6}$$

where the limits of summation are from $m+1$ to $n-(m+1)$ (block 213). As described in further detail below, either or both e and $\epsilon$ can be used for the disposition of slider in the context of track misregistration.

In general, when the slider/air-bearing flies over a given track radius, it tends to be impervious to the topography of the spinning disk. If the disk were perfectly flat, then it would be expected that the slider would fly at a uniform height from the disk as the slider is moved from one radial position to the next. As described above, the disk surface is rarely smooth. Accordingly, when attempting to move the slider from one radial position to another, disk topography will have an affect on where the slider actually flies. This is similar to to a stylus sliding over a phonograph record. Though one may choose to position the stylus on the ridge separating two adjacent grooves, the stylus will not be positioned over the ridge, but instead will be positioned within one of the grooves. Because of the misregistration, the amplitude of the signal being read will not match the amplitude expected at that radius. As the roughness of the disk increases, the slider tends to hop between valleys in the disk topography. Thus, the track misregistration is directly related to the lack of smoothness of the disk and the extent of HDI.

Figure 6B:
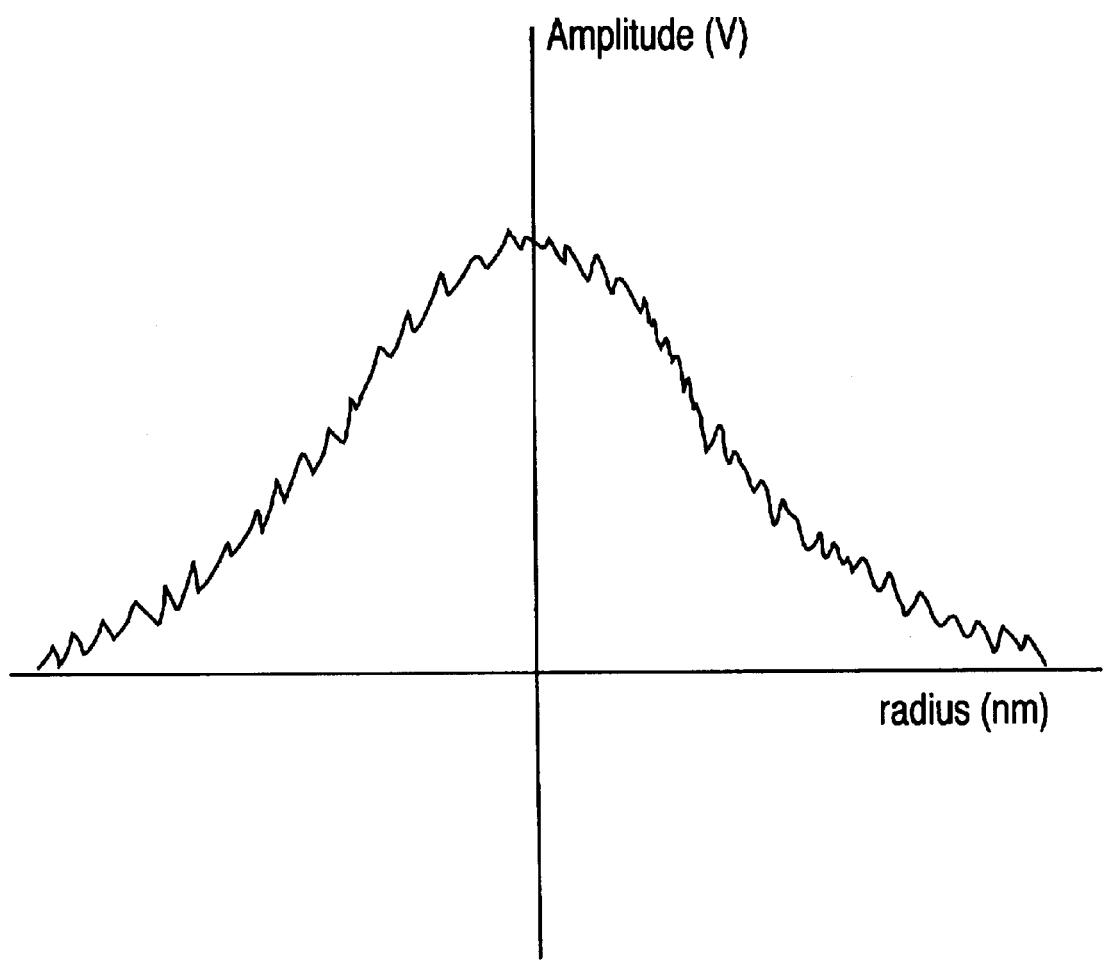

Referring to FIG. 6a, a graph of an ideal track profile is shown (read back amplitude vs. radial position). This profile can be differentiated with respect to the radial position to yield a slope profile or sensitivity profile (sensitivity of read back amplitude with respect to changes in radial position). Referring to FIG. 6b, an actual track profile is shown. The difference between the profiles of FIGS. 6a–b can be divided by the sensitivity profile to yield a profile of radial position error. Further processing of the radial position error statistically can produce a scalar value representing the severity of HDI for the slider/disk used in connection with FIG. 6b. The ideal track profile of FIG. 6a, however, is not available for a particular slider/disk combination. According to an embodiment of the present invention described above, only the track profile of FIG. 6b is generated (as A(i)). This track profile is differentiated to generate a sensitivity profile (as B(i)), which can then be smoothed by generating an average slope (or average) profile (C(i)). The average profile (C(i)) can be thought of as an approximation of the ideal sensitivity profile. The difference (D(i)) between the "ideal" sensitivity profile (C(i)) and the "actual" sensitivity profile (B(i)) divided by the "ideal" sensitivity profile can then be used to generate a track misregistration profile (E(i)). As described above, the TMR profile can be turned into a scalar value representing, for example, the average or root-mean-square to represent the HDI for the slider.

Figure 5:
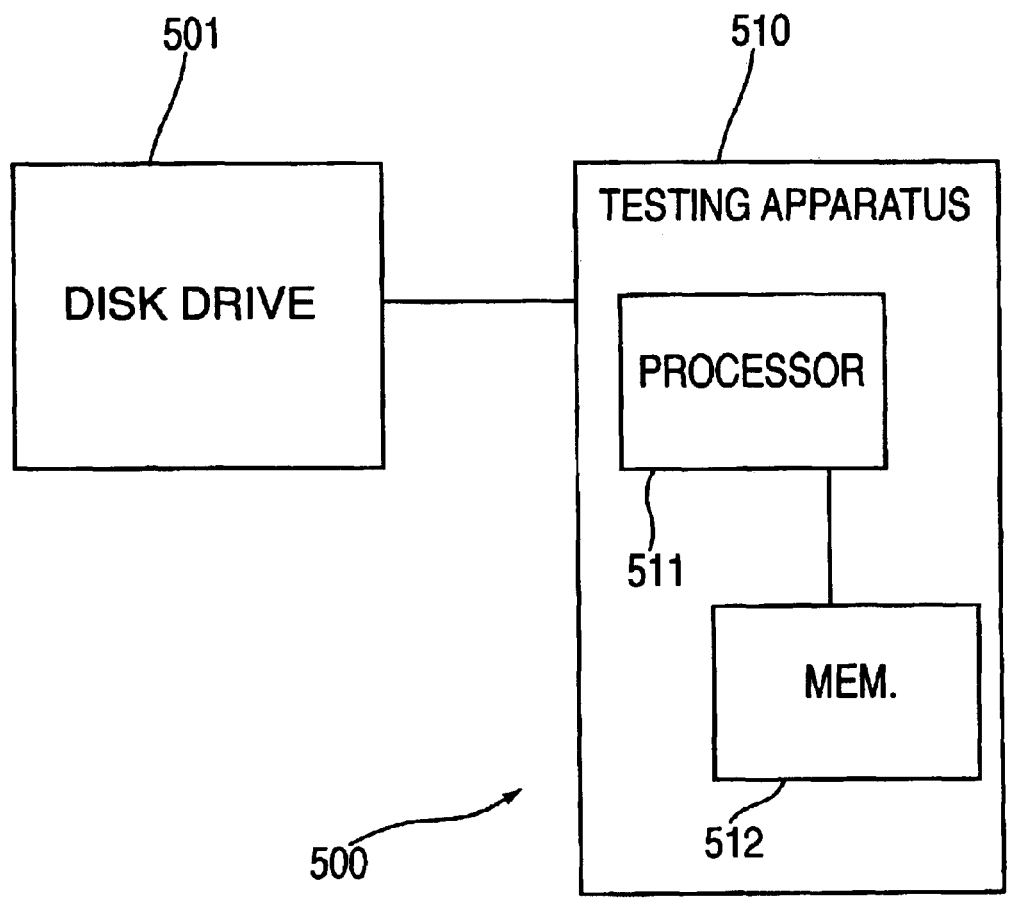
FIG. 5 is a block diagram of system for implementing a method according to an embodiment of the present invention.

The present invention may be implemented without addition or modification of the hardware. It may be implemented using the software provided in standard DP testers such as a Guzik spinstand tester or a KMY tester. Referring to FIG. 5, a testing system 500 for head disk interference is shown. The testing system 500 is similar to those known in the art for performing dynamic parametric tests of disk drive components in this embodiment, the testing system 500 has a spindle test stand 501 with the slider and disk to be tested (not shown). A testing device 510 is provided as well. In this embodiment, the testing device includes a processor 511 that executes code stored in memory 512 in accordance with the teachings above to manipulate the slider in spindle test stand 501 and generate the profiles and scalar values relating to HDI.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A method of measuring head disk interference comprising:

generating a track profile for a head at a plurality of radii across a track on a disk for recording data;

generating a sensitivity profile from said track profile;

generating an ideal sensitivity profile from said track profile;

determining a track misregistration profile for said head relative to said track based on said sensitivity and ideal sensitivity profiles.

2. The method of claim 1 wherein said determining operation includes generating a vertical distance profile based on said sensitivity and ideal sensitivity profile;

calculating said track misregistration profile from said vertical distance profile and said ideal sensitivity profile.

3. The method of claim 2 further comprising:
calculating an average radial position error from said track misregistration profile.

4. The method of claim 2 further comprising:
calculating a root-mean-square radial position error from said track misregistration profile.

5. A method of measuring head disk interference comprising:
generating a track profile for a head at a plurality of radii across a track on a disk for recording data, said track profile including an amplitude of a read-back signal for each radius;
generating a slope profile from said track profile;
generating an average slope profile from said slope profile;
generating a vertical distance profile from said slope and average slope profiles; and
generating a track misregistration profile from said vertical distance and average slope profiles.

6. The method of claim 5 wherein said track profile represents the amplitude of the read-back signal for n radii across the track on the disk and said slope profile is generated as $B(i)=A(i+1)-A(i)$ where $A(i)$ is the track profile and $i=1, \ldots, n-1$.

7. The method of claim 5 wherein said average slope profile is generated as $$C(i) = \frac{1}{2m+1} \cdot \sum_{j=i-m}^{j=i+m} B(j)$$

where $i=m+1, \ldots, n-(m+1)$.

8. The method of claim 7 wherein the vertical distance profile is generated as $$D(i)=|C(i)-B(i)|$$

where $i=m+1, \ldots, n-(m+1)$.

9. The method of claim 8 wherein the track misregistration profile is calculated as $$E(i)=S \times D(i)/C(i)$$

where S is a distance between adjacent radii over said track and $i=m+1, \ldots, n-(m+1)$.

10. The method of claim 9 further comprising:
calculating a weighted average e of the track misregistration profile as $$e = S \cdot \sqrt{\frac{\sum [C(i) \cdot D(i)]}{\sum [C(i) \cdot C(i)]}}$$

where $i=m+1, \ldots, n-(m+1)$.

11. The method of claim 9 further comprising:
calculating a root-mean-square of the track misregistration profile, $\epsilon$, as $$\varepsilon = S \cdot \sqrt{\frac{\sum [C^2(i) \cdot D^2(i)]}{\sum C^4(i)}}$$

where $i=m+1, \ldots, n-(m+1)$.

12. A testing system to measure head disk interference comprising:
a disk drive including a read head and disk with at least one track for recording data;
a testing device coupled to said disk drive, said testing device to generate a track profile for read head at a plurality of radii across the track; generate a sensitivity profile from said track profile; generate an ideal sensitivity profile from said track profile; and determine a track misregistration profile for said relative to said track based on said sensitivity and ideal sensitivity profiles.

13. The testing system of claim 12 wherein said testing device is to determine the track misregistration profile by generating a vertical distance profile based on said sensitivity and ideal sensitivity profile; and calculating said track misregistration profile from said vertical distance profile and said ideal sensitivity profile.

14. The testing system of claim 13 wherein said testing device is to calculate an average radial position error from said track misregistration profile.

15. The testing system of claim 13 wherein said testing device is to calculate a root-mean-square radial position error from said track misregistration profile.

16. A set of instructions residing in a storage medium, said set of instructions capable of being executed by a processor to implement a method for measuring head disk interference, the method comprising:
generating a track profile for a head at a plurality of radii across a track on a disk for recording data;
generating a sensitivity profile from said track profile;
generating an ideal sensitivity profile from said track profile;
determining a track misregistration profile for said relative to said track based on said sensitivity and ideal sensitivity profiles.

17. The set of instructions of claim 16 wherein in said method said determining operation includes
generating a vertical distance profile based on said sensitivity and ideal sensitivity profile;
calculating said track misregistration profile from said vertical distance profile and said ideal sensitivity profile.

18. The set of instructions of claim 17 wherein said method further comprises
calculating an average radial position error from said track misregistration profile.

19. The set of instructions of claim 17 wherein said method further comprises
calculating a root-mean-square radial position error from said track misregistration profile.

* * * * *